United States Patent [19]

Delesandri

[11] 4,059,872
[45] Nov. 29, 1977

[54] HOSE CLAMP ASSEMBLY

[76] Inventor: Domenico Delesandri, P. O. Box 428, League City, Tex. 77573

[21] Appl. No.: 634,540

[22] Filed: Nov. 24, 1975

[51] Int. Cl.² ........................ F16L 3/08; B65D 63/00
[52] U.S. Cl. ..................................... 24/284; 24/283; 24/279; 403/385; 248/74 R
[58] Field of Search ........ 24/279, 81, 81 CC, 81 AD; 403/385, 386, 398; 248/226, 229, 230, 74 R; 151/37; 61/112; 166/.5; 285/137

[56] References Cited

U.S. PATENT DOCUMENTS

| | | | |
|---|---|---|---|
| 1,036,324 | 8/1912 | Perry | 24/283 |
| 1,214,308 | 1/1917 | Inglis et al. | 24/283 |
| 1,874,462 | 8/1932 | Crowther | 151/37 |
| 2,417,741 | 3/1947 | Dillon | 24/279 |
| 3,006,669 | 10/1961 | Novales | 403/385 |
| 3,167,286 | 1/1965 | Sherburne | 24/279 |
| 3,311,132 | 3/1967 | McWilliams | 61/112 |
| 3,423,113 | 1/1969 | Gonsalves et al. | 24/279 |
| 3,437,299 | 4/1969 | Lindsey | 248/74 R |
| 3,718,183 | 2/1973 | Scott | 166/.5 |
| 3,940,832 | 3/1976 | Kelly | 248/74 R |

FOREIGN PATENT DOCUMENTS

| | | | |
|---|---|---|---|
| 1,175,980 | 3/1959 | France | 403/385 |
| 257,898 | 12/1926 | United Kingdom | 24/283 |

Primary Examiner—Paul R. Gilliam
Assistant Examiner—Victor N. Sakran
Attorney, Agent, or Firm—Browning, Bushman & Zamecki

[57] ABSTRACT

Disclosed is a clasp assembly for gripping a submarine hydraulic hose or the like which is being suspended by a metal cable. The clasp comprises a tubular clasp body including two matching partial tubular clasp elements which are hinged together along one edge. Lock means which are provided to maintain the two elements together about the hose includes a flange which diverges from each clasp element. A releasable fastener means draws the two flanges toward each other to lock the clasp in its closed position. Each of the clasp elements is equipped with a liner of rubber-like material to provide a firm friction grip on the hose. Clamp means are provided on the exterior of one of the clasp elements for attaching the clasp assembly to a cable or the like used to suspend the hose.

5 Claims, 4 Drawing Figures

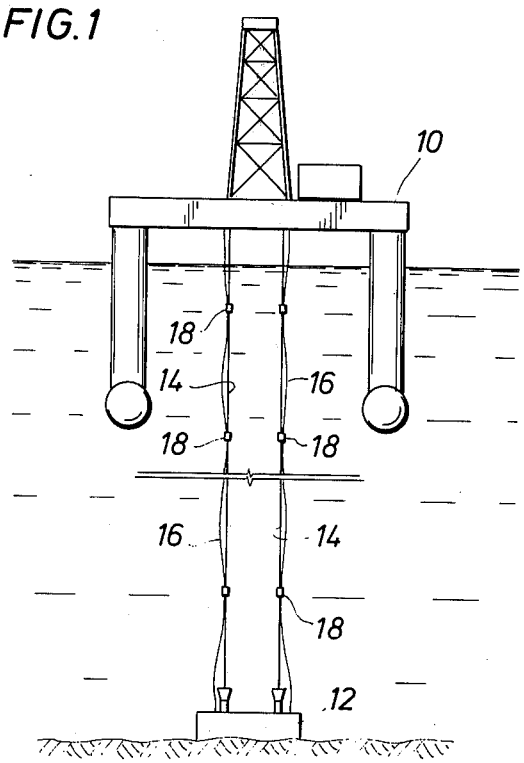
FIG.1
FIG.3
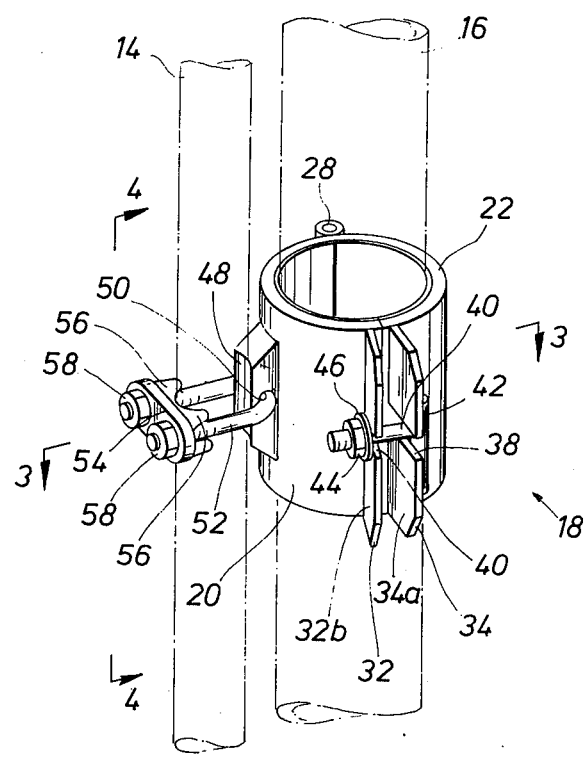
FIG.2
FIG.4

HOSE CLAMP ASSEMBLY

BACKGROUND OF THE INVENTION

1. Field of the Invention

The present invention pertains to a clasp assembly for gripping a hose or similar elongated flexible member. In particular, it pertains to a type of clasp assembly and to attach a hydraulic hose or the like to a taut wire cable or other supporting member.

In connection with offshore drilling of oil and gas wells and in production work and other operations on such wells, well drilling or completion equipment is frequently disposed on the ocean floor. Operations are generally controlled from a platform or vessel located above the water surface. It is frequently necessary to provide a hydraulic hose connection between the underwater equipment and the surface. Such hose connections are not generally self-supporting and cannot practically be pulled taut between the surface and the well head. The hoses are prevented from stretching or being swept about by underwater currents by attaching the hoses, at several locations along this length, to a taut steel cable extending from the surface to the subsurface equipment.

2. Description of the Prior Art

In the past, numerous mechanisms have been devised for attaching submarine hoses to metal support cables, but none have been entirely satisfactory. One of the primary problems with such devices has been the failure to provide a simple, convenient means of firmly gripping a hose without constricting or distorting it. In some cases it was necessary to resort to awkward, primitive, and inconvenient expedients such as securing the hose with ropes used either alone or as auxiliary gripping means together with some type of clasp. In other cases, clasps alone are used. These, however, are relatively mechanically complicated and thus expensive. They often involve extensive moving parts such as boom assemblies. Still other prior art clasps require a number of separate parts which must be removed to open and close the clasp. These parts are easily lost when being handled on board the surface platform or when being handled underwater by divers. Still another problem with certain of these prior art clasps is that they may be gradually worked open while in use due to the constant current induced movement of the hoses.

SUMMARY OF THE INVENTION

The present invention provides an improved clasp assembly which is simple and convenient but which firmly grips the hose without constricting or distorting it. The clasp assembly has a minimum number of separable parts and is preferably designed so that the portion which grips the hose can be opened and closed without removing any of the clamp parts. The assembly also includes simple but highly reliable means to prevent opening of the clasp while in use.

In particular, the clasp assembly comprises a tubular clasp body including two partial tubular clasp elements each having a respective longitudinally extending edge. The two edges are opposed, and the clasp elements are preferably longitudinally hinged together to permit movement of the edges toward and away from each other to open and close the clasp body.

A liner of friction gripping material is disposed on the interior of each clasp element. The clasp body is preferably longer than it is wide so that adequate surface area is provided for ensuring a strong frictional grip on the hose.

The clasp assembly also includes improved lock means in which a holder extends outwardly from the edge of each clasp element. The two holders diverge from each other and a connector such as a bolt extends through openings in each of the holders to hold the clasp closed. One end of the bolt is hinged to one holder and the opposite bolt end is threaded to receive a nut. When the nut is in place on the bolt, the nut surface meets the holder at an angle which prevents the nut from unthreading. The divergence of the holders also prevents the clasp from opening even if the nut is partially unthreaded.

A cable clamp is provided on the exterior of one of the clasp elements to secure the clasp to a metal cable.

It is thus a principal object of the present invention to provide an improved hose clasp assembly which is simple, convenient, and reliable.

It is a further object of the invention to provide a hose clamp assembly having a friction gripping liner.

Still another object of the invention is to provide a clasp assembly having improved lock means which allow opening and closing of the clasp without removal of parts.

Yet a further object of the present invention is to provide means for preventing undesired opening of a clasp assembly in use.

One more object of the invention is to provide improved clamp means for a clasp assembly.

Still other objects, features, and advantages of the invention will be made apparent by the following description of the preferred embodiment, the drawings, and the claims.

BRIEF DESCRIPTION OF THE DRAWINGS

FIG. 1 is an elevation of an offshore drilling ring and subsea well head employing hose clasps according to the present invention;

FIG. 2 is an enlarged perspective view of the hose clasp;

FIG. 3 is a cross section taken on lines 3–3 of FIG. 2; and

FIG. 4 is an elevation taken on lines 4—4 of FIG. 2.

DESCRIPTION OF THE PREFERRED EMBODIMENT

Referring first to FIG. 1, there is shown a floating offshore drilling rig or platform 10 located above a subsea well head 12. A number of taut guide cables 14 extend from the platform 10 to the well head 12 in a well known manner. A number of hoses 16 also extend from the platform to the well head to apply hydraulic fluid pressure to the latter. Each of the hoses 16 is connected to a respective one of the cables 14 at several locations along their lengths by clasps 18.

Turning now to FIGS. 2–4, the clasp 18 includes a tubular clasp body in the form of a split cylinder, comprising first and second partial tubular, semi-cylindrical, clasp elements 20 and 22 respectively. The clasp elements 20, 22 have respective opposed longitudinally extending edges 24, 26 which abut each other when the clasp is closed as shown. The clasp elements 20, 22 are connected by a longitudinally extending hinge 28 opposite the edges 24, 26 to permit these edges to move toward and away from each other to open and close the clasp body.

The clasp body 20, 22 is formed of a rigid metal such as steel, and has a generally tubular liner 30 disposed on its interior surface. The liner 30 is longitudinally split at 30a adjacent the clasp elements' edges 24, 26 and also at 30b adjacent the hinge 28 to accommodate the pivotal movements of the clasp elements 20, 22 relative to each other. The liner 30 is preferably comprised of a natural or synthetic elastomer to provide frictional engagement with the hose 16. While it has been found that elastomers provide an especially good friction grip for the elastomeric materials of which hoses are ordinarily comprised, it will be understood that the liner 30 could be formed of virtually any other material which would provide a suitable, non-damaging friction grip with a particular hose material.

The clasp body 20, 22 and liner 30 are sized to fit snugly around the hose 16 with which they are used without constricting or distorting this hose. The metal-to-metal contact between edges 24, 26 when the clasp is closed ensure against such constriction and distortion. The length of the clasp body is selected to provide sufficient surface area for ensuring the appropriate friction gripping action of liner 30. While the necessary axial extent of the body 20, 22 might vary with particular applications, it has been found that, in a typical application using a 4-inch diameter hose, an axial clasp body length of about 6 inches is preferable. This suggests that an axial extent of about 1.5 times the hose diameter will be satisfactory in many instances. However, in general, it is merely necessary to provide sufficient axial extent to the clasp body so that, with the gripping liner, a firm but frictional rather than constricting gripping action is obtained.

The liner 30 may be attached to the interior of the clasp body in any suitable manner including various types of bonding or by use of an adhesive. Since the liner 30 is frequently stored in a substance such as diesel fuel after its use to prevent rotting, if an adhesive is used, it should be one which is insoluble in the diesel fuel or other treating liquid.

The clasp assembly includes lock means adjacent the edges 24, 26 to releasably hold the clasp body in closed position in use. The lock means comprises first and second holders in the form of longitudinally extending flanges 32, and 34 extending generally radially away from clasp elements 20 and 22. First holder 32 has an inner side surface 32a and an outer side surface 32b while the second holder 34 has an inner side surface 34a and an outer side surface 34b. Each of the holders 32, 34 has a respective opening 36, 38 therethrough from one side surface to the other. The openings 36, 38 are in the form of slits which also open radially through their respective holders 32, 34.

The lock means further includes a connector comprising a T-shaped bolt 40 which extends through openings 36, 38 when the clasp body is locked in its closed position as shown. The bolt 40 includes an elongate base 40a which extends through openings 36, 38 and a pair of arms 40b at right angles thereto. The free end of base 40a is disposed adjacent the outer side surface 32b of first holder 32 when the clasp body is locked closed and may be considered the first end of the bolt 40. The arms 40a, which may be considered the second end of bolt 40 are disposed adjacent the edge 26 of the second clasp element 22. In particular, the arms 40b are pivotally mounted on the outer side surface 34b of holder 34 by a pair of coaxial annular retainers 42 welded to surface 34b on opposite sides of slit 38. Each of the arms 40b is disposed in a respective one of the retainers 42 which thus serves as fixing means to limit movement of the arms 40b toward and away from edge 26. The axis of retainers 42 is generally parallel to the longitudinal axis of the clasp body so that, as the arms 40b rotate in the retainers 42, the base 40a may swing radially into and out of the slits 36 and 38.

The bolt base 40a may be placed in the slits 36 and 38 such that the clasp body may be locked in its closed position by means of fastener means on the free end of base 40a. The fastener means comprises a nut 44 threaded onto the free end of the bolt base 40a and including a washer 46 welded to the nut proper adjacent the outer side surface 32b of holder 32. The washer is wider than the slit 36.

As best seen in FIG. 3, the holders 32 and 34 flare away from each other from their radially inner to their radially outer extremities. Thus a portion 32b' of surface 32b, located radially outwardly of bolt 40 (when the latter is in locking position in slits 36, 38) flares away from edge 24 from its radially inner to its radially outer extremity. To lock the clasp body in closed position, the nut 44 is advanced toward surface 32b until the washer 46 is brought to bear tightly against flared portion 32b'. This engagement between washer 46 and flared portion 32b' of surface 32b serves to prevent nut 44 from backing off from surface 32b during use to loosen or release the clasp body. This effect is enhanced by the fact that slit 36 forms sharp edges on portion 32b' which bite into the washer 46. The flaring of the holders 32 and 34, and in particular of portion 32b', also serves to prevent unwanted opening of the clasp body by abutment with washer 46 even if nut 44 should be inadvertently backed away from surface 32b somewhat. However, the bolt 36 is long enough that, when the clasp is intentionally opened, nut 44 can be backed off a substantial distance to allow washer 46 to clear surface portion 32b' and permit the bolt to swing out of slits 36 and 38 with the nut still being carried by the end of the bolt. Thus the clasp body can be opened and closed without removal of any parts. This is helpful in preventing loss of parts particularly if the clasp is to be operated by divers underwater.

A cable clamp is attached to the exterior of either one of the clasp elements, in this case first clasp element 20, midway between edge 24 and hinge 28. Such location, at 90° from the edges 24, 26 as well as from the hinge 28, has proven to be most advantageous in preventing undue stress or strain on the clasp assembly in use. The cable clamp comprises a rib 48 having a transverse notch 50 for receipt of the mid-portion of a U-shaped bolt 52. The bolt 52 is welded into notch 50, and rib 48 is then welded to the exterior of the clasp in generally longitudinally extending disposition and with notch 50 toward the clasp element. The rib 48 thus serves as a backing member for the cable 14 and the legs of the U-shaped bolt 52 serve as a pair of guide limbs extending radially from the clasp element on opposite sides of the rib 48. The radially outer surface 48a of the rib 48 is concave transverse to its length to receive the cable 14 and conform to its configuration thereby preventing crimping, breakage, etc. of the cable. A conventional cable grip member 54 is slidably mounted on the guide limbs of U-shaped bolt 52, the limbs extending through respective bores in grip member 54 for movement toward and away from the surface 48a. The grip member 54 provides a grip surface 54a opposed to surface 48a and also includes at least one pair of tines 56 extending generally toward the surface 48a on opposite sides of rib 48. When the grip member 54 is moved toward rib 48 to clamp the cable 14 between surfaces 54a and 48a, the tines 56 are disposed adjacent opposite sides of rib 48 to stabilize the assembly. However, the rib 48 has sufficient radial extend that the tines 56 will not be permitted to abut the clasp element 20 prior to engagement of the cable between surfaces 54a and 48a. Thus a tight engagement of the cable by the clamp is ensured. Grip member 54 is locked in place by nuts 58 threaded to respective legs of the bolt 52. For convenience in use of the clasp assembly, the nuts 58 are identical to nut 44 so that one wrench can be used for all three.

In a modified form of the clasp assembly, the rib 48 may be connected to the clasp element by flexible members such as chains rather than welded to the clasp body. Such modified assemblies may be used as the lowermost assemblies on each hose 16 adjacent the well head 12 as more play between the hose 16 and cables 14 is required in this area.

It will be appreciated that the clasp assembly provides for reliable gripping of a hose by a frictional rather than a constricting engagement. At the same time, the assembly is simple, employing a number of standard parts such as bolts, nuts, hinges, cable clamps, etc. as well as specialized parts which can be easily and cheaply fabricated from pipe, plate metal, etc. The assembly comprises a minimum of relatively moving parts and the clasp body can be opened and closed without removal of any parts. The lock means of the assembly further ensures against unwanted loosening or opening of the clasp body, while the clamp portion prevents crimping or breaking of the cable. While the clasp assembly would ordinarily be assembled and connected to the hose and clasp on the drilling platform 10, it is designed so that it can be readily employed underwater by a diver with a single simple tool.

It will also be appreciated that many modifications of the preferred embodiment are possible without departing from the invention. In particualar, while the invention has been described in connection with offshore drilling or production operations, it can be used in numerous other environments in which a hose or other flexible elongate member must be firmly gripped. Numerous changes could also be made in the configuration of the various parts. Additionally, certain features could, if desired, be omitted while still retaining many of the advantages of the invention. It is thus intended that the scope of the invention be limited only by the claims which follow.

I claim:

1. In combination with an elongate, constictable, relatively slack hose, and an elongate, substantially incompressible, relatively taut cable disposed generally laterally adjacent and parallel thereto, a clasp assembly for gripping said hose and securing said hose to said cable for stabilizing said hose underwater, said clasp assembly comprising:
   a. mating first and second gripping components with a pivotable connection to each other, said components having respective opposed longitudinally extending edges distal said pivotable connection, and movable about said connection to encircle said hose for frictional, substantially non-constricting gripping engagement between said clasp assembly and said hose;
   b. locking means on said gripping components for locking said components together, said locking means including:
      i. a bolt section pivotally secured to said first gripping component adjacent its edge and having a threaded movable end;
      ii. a nut member threaded to said movable end of said bolt section;
      iii. a plate member rigidly adjoined to and extending generally radially from said second gripping component adjacent its edge, said plate member having a generally radially opening slit therein for receipt of said bolt section, and an outer side surface flared away from said edge of said second gripping component from its radially innermost to its radially outermost extremity whereby said nut member may engage said outer side surface, when said bolt section is received in said slit, at an angle to lock said components together; and
   c. clamp means connected to the exterior of one of said components for gripping said cable.

2. The combination of claim 1 wherein:
   a. said locking means further includes a second plate member extending generally from said one gripping component adjacent its edge and having an outer side surface;
   b. said second plate member has a slit opening generally radially therethrough;
   c. said bolt section is hingedly mounted on the outer side surface of said second plate member for swinging movement into and out of said slits upon release of said nut member.

3. The combination of claim 1 wherein said slit in said one plate member forms at least one relatively sharp edge on said outer side surface, and wherein said nut member comprises a rigid washer tightly engageable with said edge at said angle.

4. The combination of claim 1 wherein the length of said clasp body is substantially greater than its width.

5. The combination of claim 1 wherein said clamp means comprises a backing member connected to the exterior of one of said gripping components and having a radially outer surface abutting said second member and concave transverse to the length of said second member, and grip means movable toward and away from said radially outermost surface.

* * * * *